US009118584B2

(12) United States Patent
Ayanam et al.

(10) Patent No.: US 9,118,584 B2
(45) Date of Patent: *Aug. 25, 2015

(54) DYNAMIC SCALABLE BASEBOARD MANAGEMENT CONTROLLER STACKS ON SINGLE HARDWARE STRUCTURE

(71) Applicant: American Megatrends, Inc., Norcross, GA (US)

(72) Inventors: Varadachari Sudan Ayanam, Suwanee, GA (US); Samvinesh Christopher, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 260 days.

This patent is subject to a terminal disclaimer.

(21) Appl. No.: 13/844,181

(22) Filed: Mar. 15, 2013

(65) Prior Publication Data

US 2014/0280837 A1    Sep. 18, 2014

(51) Int. Cl.
*H04L 12/24* (2006.01)
*H04L 12/26* (2006.01)
*G06F 11/30* (2006.01)

(52) U.S. Cl.
CPC .............. *H04L 41/24* (2013.01); *G06F 11/30* (2013.01); *H04L 43/0817* (2013.01)

(58) Field of Classification Search
USPC ......................................... 709/223, 224, 204
See application file for complete search history.

(56) References Cited

U.S. PATENT DOCUMENTS

| 8,180,862 | B2* | 5/2012 | Baker et al. ................... 709/220 |
|---|---|---|---|
| 8,891,515 | B2* | 11/2014 | Yu ................................ 370/376 |
| 9,043,527 | B2* | 5/2015 | Bhatia et al. ................... 710/313 |
| 2008/0163194 | A1* | 7/2008 | Dias et al. ...................... 717/174 |
| 2010/0302945 | A1* | 12/2010 | Leppanen et al. ............. 370/235 |
| 2013/0159561 | A1* | 6/2013 | Cong ............................ 710/19 |
| 2014/0006764 | A1* | 1/2014 | Swanson et al. ................ 713/2 |
| 2014/0181573 | A1* | 6/2014 | Goss et al. .................... 714/5.11 |
| 2014/0195657 | A1* | 7/2014 | Bhatia et al. ................... 709/223 |
| 2014/0195711 | A1* | 7/2014 | Bhatia et al. ................... 710/313 |
| 2014/0280947 | A1* | 9/2014 | Christopher et al. ......... 709/226 |

* cited by examiner

*Primary Examiner* — Jude Jean Gilles
(74) *Attorney, Agent, or Firm* — Locke Lord LLP; Tim Tingkang Xia, Esq.

(57) ABSTRACT

Certain aspects of the present disclosure are directed to a baseboard management controller (BMC) managing a computer system including N computer nodes and N is an integer greater than 1. The BMC has: (a) a processor, (b) a first communication interface controller, (c) a memory. The memory stores a firmware, and the firmware is executed by a processor of the BMC. The firmware, when executed by the processor, is configured to (a) dynamically obtain the value of N, and (b) initiate N virtual BMC stacks each managing at least one health or performance related aspect of a respective one of the N computer nodes. The first and second virtual BMC stacks of the N virtual BMC stacks communicate, through the first communication interface controller, with the first and second computer nodes of the N computer nodes, respectively.

25 Claims, 3 Drawing Sheets

DYNAMIC SCALABLE BASEBOARD MANAGEMENT CONTROLLER STACKS ON SINGLE HARDWARE STRUCTURE

FIELD

The present disclosure generally relates a baseboard management controller (BMC) for management control of computing platforms, and more particularly to implementation of dynamic scalable BMC stacks on a single BMC hardware structure.

BACKGROUND

Conventionally, multiple pieces of management hardware are required to manage computing functions of multiple computing platforms, where each management hardware device has a single instance of management firmware for a respective one of the computing platforms. There is an associated cost for each computing platform to be managed in a plurality of computing platforms, such as server platforms, because each managed computing platform requires a separate management hardware device. Additionally, in order to implement IPMI message transmission, a separate physical network device and a unique network address will be needed for each of the managed computing platform. Accordingly, introducing an additional computing platform to be managed can incur additional cost for the management hardware.

Therefore, heretofore unaddressed needs still exist in the art to address the aforementioned deficiencies and inadequacies.

SUMMARY

Certain aspects of the present disclosure are directed to a baseboard management controller (BMC) managing a computer system including N computer nodes and N is an integer greater than 1. The BMC has: (a) a processor, (b) a first communication interface controller, (c) a memory. The memory stores a firmware, and the firmware is executed by a processor of the BMC. The firmware, when executed by the processor, is configured to (a) dynamically obtain the value of N, and (b) initiate N virtual BMC stacks each managing at least one health or performance related aspect of a respective one of the N computer nodes. The first and second virtual BMC stacks of the N virtual BMC stacks communicate, through the first communication interface controller, with the first and second computer nodes of the N computer nodes, respectively.

In certain embodiments, when executed by the processor, the firmware is configured to access a configuration file to obtain the value of N, and to initiate a predetermined number of virtual BMC stacks. These virtual BMC stacks include the first virtual BMC stack, during a booting process. The first virtual BMC stack communicates with each of the N computer nodes to obtain the value of N. In certain embodiments, the first virtual BMC stack is configured to receive an IPMI message from each of the N computer notes during obtaining the value of N, and to receive the IPMI message from a BIOS or an OS of the each computer node. In certain embodiments, the firmware is configured to initiate a predetermined number of virtual BMC stacks. These virtual BMC stacks include the first virtual BMC stack, during a booting process, and the first virtual BMC stack receives an IPMI message from one of the N computer nodes, the IPMI message indicating the value of N.

In certain embodiments, each of the virtual BMC stacks implements all management functions for managing health and performance related aspects of the respective one of the N computer nodes. In certain embodiments, each of the virtual BMC stacks includes a Web server, a management program, a redirection program, and a virtual media program. The first communication interface controller is a controller for controlling one of a keyboard controller style ("KCS") interface, a system management interface chip ("SMIC") interface, a block transfer ("BY") interface, an SMBus System Interface (SSIF), an IPMB interface, a USB interface, a serial/modem interface, and a network interface. In certain embodiments, the BMC also has a second communication interface controller different from the first communication interface controller. The first and second virtual BMC stacks communicate, through the second communication interface controller, with the first and second computer nodes, respectively.

Certain aspects of the present disclosure are directed to a base board management controller (BMC) implemented method for managing a computer system having N computer nodes, N being an integer greater than 1. The method includes: (a) dynamically obtaining the value of N by accessing a configuration file by a firmware stored in a memory of the BMC, and (b) initiating N virtual BMC stacks at a processor. Each of the virtual BMC stacks manages at least one health or performance related aspect of a respective one of the N computer nodes. The first and second virtual BMC stacks of the N virtual BMC stacks communicate, through a first communication interface controller, with the first and second computer nodes of the N computer nodes, respectively.

In certain embodiments, the method includes: (a) initiating, at the BMC, a predetermined number of virtual BMC stacks. The virtual BMC stacks include the first virtual BMC stack, during a booting process, and the first virtual BMC stack communicates with each of the N computer nodes to obtain the value of N. The method also includes: (a) receiving, at the first virtual BMC stack, an IPMI message from each of the N computer notes during obtaining the value of N, and (b) receiving, at the first virtual BMC stack, the IPMI message from a BIOS or an OS of the each computer node.

In certain embodiments, the method includes initiating, at the BMC, a predetermined number of virtual BMC stacks, including the first virtual BMC stack, during a booting process. The first virtual BMC stack receives an IPMI message from one of the N computer nodes, the IPMI message indicating the value of N. In certain embodiments, each of the virtual BMC stacks implements all management functions for managing health and performance related aspects of the respective one of the N computer nodes, and each of the virtual BMC stacks includes a Web server, a management program, a redirection program, and a virtual media program.

Certain aspects of the present disclosure are directed to a non-transitory computer storage medium. The non-transitory computer storage medium stores computer-executable instructions. When the computer-executable instructions are executed by a processor of a BMC, cause the processor to: (a) dynamically obtain a value of N, N being an integer greater than 1, by accessing a configuration file by a firmware stored in a memory of the BMC, and (b) initiate N virtual BMC stacks at the processor, each managing at least one health or performance related aspect of a respective one of the N computer nodes. The first and second virtual BMC stacks of the N virtual BMC stacks communicate, through a first communication interface controller, with the first and second computer nodes of the N computer nodes, respectively. In certain embodiments, the computer-executable instructions cause the processor to initiate, at the BMC, a predetermined number of virtual BMC stacks, including the first virtual BMC stack, during a booting process, and the first virtual BMC stack communicates with each of the N computer nodes to obtain the value of N. In certain embodiments, the computer-executable instructions also cause the processor to (a) receive, at the first virtual BMC stack, an IPMI message from each of the N computer notes during obtaining the value of N, and (b) receive, at the first virtual BMC stack, the IPMI message from a BIOS or an OS of the each computer node.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 1:
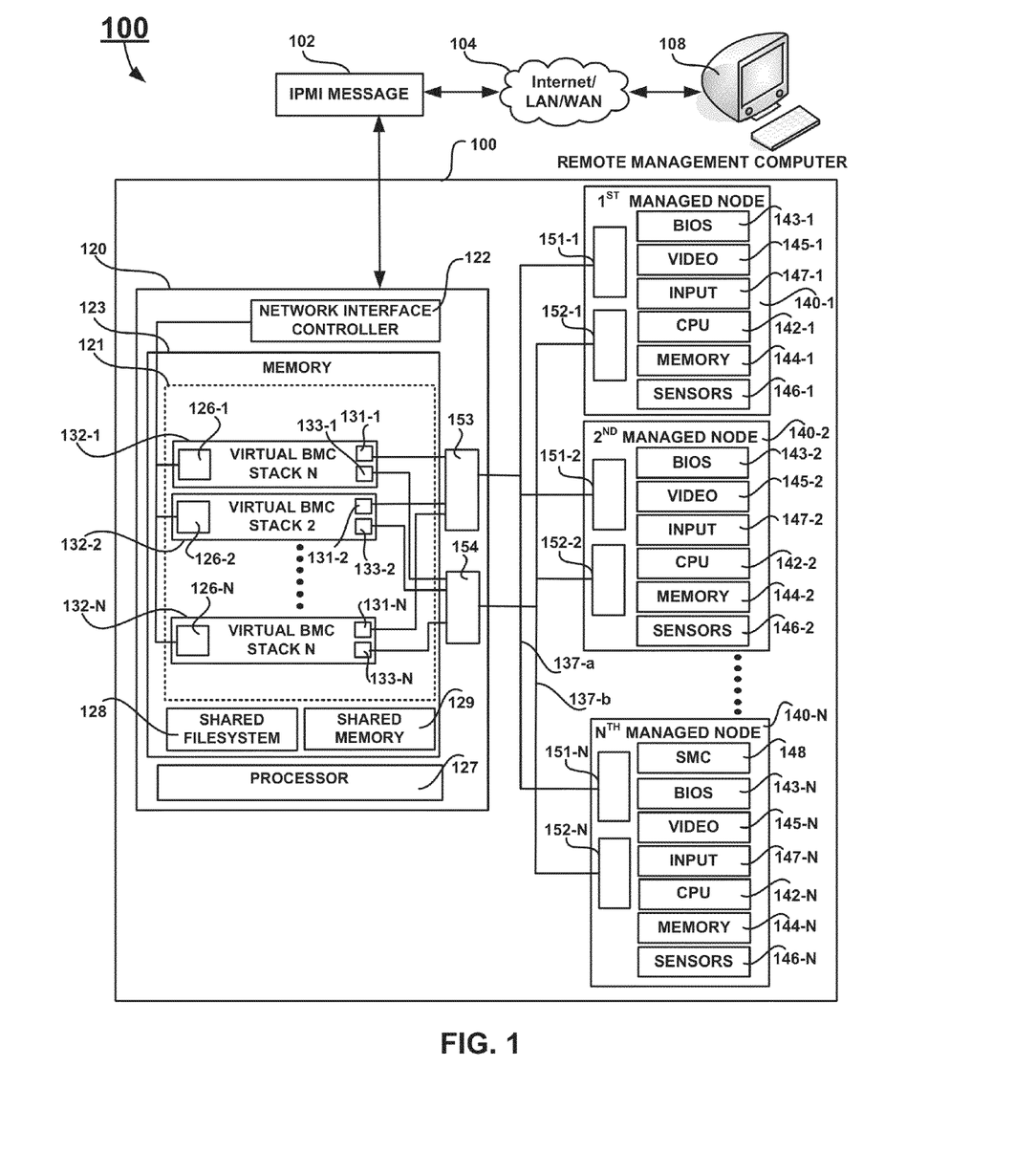
FIG. 1 schematically shows a computer management system in accordance with certain embodiments of the present disclosure.

Referring to FIG. 1, a conceptual illustration of a computer management system 100 is shown according to one embodiment of the present disclosure. The computer management system 100 includes a management device 120, and one or more managed computer nodes 140-I, I=1, 2, . . . , N. In certain embodiments, the management device 120 can be a Baseboard Management Controller (BMC), and the managed computer nodes can be computer boards or blade servers plugged onto a back plane in a chassis. The management device 120 communicatively connected to the managed computer nodes 140-I. The management device has one or more communication interface controllers 153, 154 for communication with the managed computer nodes. Each of the communication interface controllers 153, 154 can be controllers for controlling any system interface defined by the IPMI, i.e., keyboard controller style ("KCS") interface, a system management interface chip ("SMIC") interface, a block transfer ("BT") interface, and SMBus System Interface (SSIF). Each of the communication interface controllers 153, 154 can also control IPMB interfaces, a USB interfaces, serial/modem interfaces, and network interfaces.

Each of the managed computer node 140-I has one or more communication interface controllers 151-I, 152-I that can be used to communicate with a corresponding communication interface controller 153-I, 154 of the management device 120 through an established communication channel 137-a, 137-b. For example, both the management device 120 and a managed computer node 140-I can have a system management bus interface controller 153, 151-I and communicate through a connected system management bus 137-a. In certain embodiments, both the management device 120 and the managed computer node 140-I can have a USB interface controller 154, 152-I and communicate through a connected USB channel 137-b.

Although FIG. 1 only illustrates two communication interface controllers 153, 154 and two communication channels 137-a, 137-b, one skilled in the art should appreciate that the management device 120 and the managed nodes 140-I can communicate with each other through any appropriate number of interface communication controllers and communication channels. In certain embodiments, the management device 120 can communicate with different managed nodes 140-I through different number of communication interface controllers and communication channels. For example, the management device 120 can communicate with the first managed node 140-I only through a system management bus interface controller and a system management bus. But the management device 120 can communicate with the second management node 140-2 through both a system management bus interface controller and a USB controller, as well as both a system management bus and a USB connection.

The management device 120 may be a general purpose computer system. It should be appreciated that the management device 120 may alternatively be a "special purpose" computer system or a system that incorporates more than one interconnected system, such as a client-server network. Indeed, the management device 120 of FIG. 1 only represents an exemplary embodiment of the present disclosure, and therefore, should not be considered to limit the disclosure in any manner. The BMC 120 will now be used in the description as an example of the management device 120. One skilled in the art would appreciate that other similar devices can be used in place of the BMC 120. In this example, the BMC 120 includes a processor 127, a network interface controller 122, and a memory 123. The memory 123 contains firmware 121, a shared file system 128 and a shared memory 129.

Intelligent Platform Management Interface ("IPMI") is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. Additional details regarding IPMI can be found in the IPMI Specification (Version 2.0), which is publicly available from INTEL CORPORATION, and which is incorporated herein by reference.

The BMC 120 can receive an external request such as an IPMI message 102 through the network interface controller 122 from a remote management computer 108 over a network 104. The network 104 can be the Internet, a local area network (LAN), a wide area network (WAN) a Wi-Fi network, a Bluetooth network, a ZigBee network, a telecommunication network, or any other suitable communication network. The BMC can also receive IPMI messages from a management computer 109, having a CPU 112 and memory 114, through a system interface 124. The IPMI message 102 may include, among other things: (1) the source IP/MAC address, (2) a session ID, (3) a sequence number, (4) a Responder's Address, (5) the Responder's Logic Unit Number (LUN), (6) a Requester's Address, (7) the Requester's LUN, (8) actual command CMD, e.g., Send Message, (9) a message Channel number, etc.

The firmware 121, when executed, can initiate a number of virtual BMC stacks 132-I, I=1, 2, . . . , N based on the number of managed computer nodes 140-I, I=1, 2, . . . , N. Typically one virtual BMC stack 132-I is responsible for managing a respective managed computer node 140-I. In circumstances, one virtual BMC stack can manage two or more managed computer nodes 140-I.

The firmware 121 can determine the number of managed computer nodes 140-I in a number of ways. For example, the number of managed computer nodes 140-I can be stored in a configuration file that is accessible by the firmware. When the BMC 120 boots up, the processor 127, as instructed by the firmware 121, reads the configuration file and then initiates a number of virtual BMC stacks 132-I according to the configuration file. The configuration file can also specify the interface controllers to be used to communicate with a specific managed computer node. For example, the configuration file can specify that the BMC 120 is in communication with the first managed node 140-1 through a system management bus and with the second managed node 140-2 through a USB connection. Accordingly, the firmware can initiate appropriate communication interfaces in each of the virtual BMC stacks for accessing those communication controllers (e.g. system management bus controller and a USB controllers). In certain embodiments, the firmware can instruct the processor to periodically check the configuration file and to determine whether the configuration has changed. The firmware can adjust the number of virtual BMC stacks in accordance with the change of the configuration.

In certain embodiments, when the BMC initially boots up, the firmware instruct the processor to initiate only one or a predetermined number of virtual BMC stacks. Subsequently, after each of the managed computer node 140-I boots up, that managed computer node 140-I can communicate with the initiated virtual BMC stack 132-I to inform the virtual BMC stack 132-I the existence of the managed computer node through its communication interfaces 151-I, 152-I such as KCS or USB or LAN, etc. For example, the BIOS or the host OS of a managed computer node 140-I can communicate with the BMC 120 through one or more communication channels such as KCS, USB, or LAN. The BMC 120 can accordingly determine the number of the managed computer nodes 140-I based on the number of the computer nodes 140-I that have communicated with the BMC 120. In certain embodiments, for each of the additional managed computer node 140-I after the first managed computer node, the firmware 121 (or the first initiated virtual BMC stack 132-I) can instruct the processor to initiate another virtual BMC stack.

In certain embodiments, during the booting process, the firmware 121 initiates a virtual BMC stack 132-1. Then, any of the managed computer nodes 140-I can send a standard IPMI command or message, through one or more communication channels such as KCS, USB, or LAN, to the initiated virtual BMC stack 132-1 to notify it is the number of the managed computer notes. After the virtual BMC stack 132-1 receives the IPMI command, it can instruct the firmware 121 to relaunch ordinary initiate the corresponding numbers of virtual BMC stacks 132-I.

Each of the virtual BMC stacks 132-I can have a network interface 126-I, and one or more communication interfaces 131-I, 133-I corresponding to the one or more communication interface controllers 153, 154 of the BMC 120. For clarity, and as one specific example only, FIG. 1 only depicts a first communication interface 131-I in communication with a first communication interface 153 and a second communication interface 133-I in communication with a second communication interface controller 154. One skilled in the art should appreciate that each of the virtual BMC stacks 132-I can have any appropriate number of communication interfaces and that the BMC 120 can have any appropriate number of communication interface controllers. A specific virtual BMC stack 132 may have some or all of the interfaces, including those defined by the IPMI, such as a keyboard controller style ("KCS") interface, a system management interface chip ("SMIC") interface, a block transfer ("BY") interface, and SMBus System Interface (SSIF), USB interface, I2C interface, and a network interface, for accessing the communication interface controllers of the BMC. For example, a first virtual BMC stack 132-1 can have a KCS interface for accessing the KCS interface controller, a USB interface for accessing the USB interface controller, and a system management bus interface for accessing the system management bus interface controller. The second virtual BMC stack 132-2 may only have a USB interface and a system management bus interface.

A single communication interface controller 153, 154 of the BMC can be shared by two or more virtual BMC stacks 132-I. A single communication interface controller 153, 154 can be responsible for the communication of a specific protocol between the BMC 120 and only some or all of the managed computer nodes 140-I. For example, the first virtual BMC stack 132-1 and the second virtual BMC stack 132-2 can each have a USB interface accessing the same USB interface controller. In certain embodiments, the same USB interface controller can be responsible for handling communication from the USB interfaces of all the virtue BMC stacks 132-I. In certain embodiments, a first USB controller is only responsible for handling communication from the USB interfaces of a first sub-set of the virtual BMC stacks, while a second USB controller is only responsible for handling communication from the USB interfaces of the second sub-set of the virtual BMC stacks 132-I.

Each of the virtual BMC stacks 132-I can also have a network interface 126-I that can access the network interface controller 122 of the BMC 120. In certain embodiments, all of the network interfaces 126-I of the virtual BMC stacks 132-I share the same network interface controller 122. After receiving a network packet, the network interface controller 122 can determine an appropriate virtual BMC stack 132-I to forward the network packet based on an indication, such as a network address, in the network packet.

Each of the virtual BMC stacks 132-I can monitor at least one health or performance related aspect of a corresponding managed computer nodes 140-I. For example, the first and second virtual BMC stacks 132-I, 132-2 monitor at least one health or performance related aspect of first and second managed computer nodes 140-1, 140-2, respectively. A virtual BMC stack 132-I can receive an IPMI message from the communication interfaces 131-I, 133-I or the network interfaces 126-I.

Each of the virtual BMC stacks 132-I implements one or more IMPI or BMC management functions. In certain embodiments, each of the virtual BMC stacks 132-I is in communication with sensors of a managed computer node 140-I through a communication channel 137-a, 137-b such as a SMBus or an I$^2$C bus. The virtual BMC stack 132-I performs one or more IPMI management functions for the managed computer node 140-I, I=1, 2, . . . , N. The virtual BMC stack 132-I can implement all the BMC functions and thus eliminates the need for having a separate BMC installed for each of the managed computer nodes. Optionally, a managed computer node 140-N can have one Satellite Management Controller (SMC) 148 to perform some of IPMI management functions instead.

In certain embodiments, some or all of the virtual BMC stacks 140-I can have access to and utilize the shared file system 128 and the shared memory 129 of the BMC 120.

As stated above, each of the virtual BMC stacks 132-I can utilize the network interface controller 122 to receive IPMI messages from, and transmit IPMI messages to, the remote management computer 108. Each of the virtual BMC stacks 132-I includes one or more communication interfaces 131-I, 133-I such as management bus interfaces for communication with a corresponding managed computer node through one or more communication channels 137-a, 137-b. The communication channels 137-a, 137-b provide two-way communication path for the BMC 120 and the IPMI devices of the managed computer nodes 140-I, I=1, 2, . . . , N. In certain embodiments, each of the managed computer nodes 140-I can include one or more communication interface controllers 151-I, 152-I, such as a management bus interface controller, that are coupled to the one or more communication channels 137-a, 137-b. For clarity, and as one specific example only, FIG. 1 only depicts the first communication interface controller 151-I and the second communication interface controller 152-I on each managed computer node 140-I.

The component that initiates a communication on a bus is referred to as a "master" component and the component to which the initial communication is sent on the bus is referred to as a "slave" component. A master component therefore issues an initial command to or initially requests information from a slave component. Each slave component is addressed, and thus communicatively accessible to master components, by a particular slave address. Both master components and slave components are operable to transmit and receive communications over communication channels 137-a, 137-b.

Buses and the associated functionality of master-slave communications are well-known to those skilled in the art, and therefore not discussed in further detail herein.

Each of the managed computer nodes 140-I, I=1, 2, ..., N by itself can be an independent computer system include a CPU 142-I, a memory 144-I, etc. In certain embodiments, a computer node 140-I can also include an optional satellite management controller (SMC) 148, one or more sensors 146-I, and a communication interface controller 151-I, 152-I. The SMC 148 and the sensors 146-I are in communication with the BMC 120. The SMC 148 can receive IPMB messages from the BMC 120 and perform certain management functions on the computer node 140-I. The SMC 148 can monitor the operation, performance, and health of the managed computer node 140-I.

For example, like many electrical components, the CPU 142-I dissipates heat while operating. As such, a CPU fan (not shown in FIG. 1) can be used to cool off the CPU 142-I after the CPU 142-I reaches a prescribed temperature. Such a determination, i.e., whether the CPU 142-I exceeds a prescribed temperature, can be made by the virtual BMC stack 132-I. As described above, the virtual BMC stack 132-I, through the communication interfaces 131-I, 133-I coupled with the communication channels 137-a, 137-b, with the CPU temperature sensor 146-I and the CPU fan to provide monitoring functionality over the temperature sensor and control functionality over the CPU fan.

In general, the virtual BMC stack 132-I monitors operation, performance, and health-related aspects associated with the managed computer node 140-I, such as the temperature of one or more components of the managed computer node 140-I, speed of rotational components (e.g., spindle motor, CPU Fan, etc.) within the system, the voltage across or applied to one or more components within the managed computer node 140-I, and the available or used capacity of memory devices within the managed computer node 140-I. The virtual BMC stack 132-I is communicatively connected to the one or more components through the one or more communication interfaces 131-I, 133-I and one or more the communication channels 137-a, 137-b. In one embodiment, these components include sensor devices 146-I for measuring various operating and performance-related parameters within the managed computer node 140-I. The sensor devices 146-I may be either hardware or software based components configured or programmed to measure or detect one or more of the various operating and performance-related parameters. The virtual BMC stack 132-I may receive this information sensed by the sensors 146-I via the communication channels 137-a, 137-b for analysis, and more particularly, for determination as to whether an "event" is occurring within the managed computer node 140-I. For example, the first virtual BMC stack 132-1 can communicates with a first managed device 146-1 of the first managed computer node 140-1 and that is coupled to the first communication channel 137-a.

Each of the communication channels 137-a, 137-b can be used by the BMC 120 to request and/or receive various operating and performance-related parameters from one or more of the managed computer nodes 140-I, I=1, 2, ..., N, which are also communicatively connected to the communication channel 137-a, 137-b. In certain embodiments, optionally the SMC 148 can also be in communication with the CPU temperature sensor 146-I and the CPU fan. Each of the communication channels 137-a, 137-b may communicate with and manage components other than those explicitly shown in FIG. 1. Exemplary components not shown in FIG. 1 may include, without limitation, tachometers, heat sensors, voltage meters, amp meters, and digital and analog sensors. In one embodiment, one of the communication channels 137-a, 137-b is an Inter-Integrated Circuit ($I^2C$) bus. In another embodiment, the communication channels 137-a, 137-b is a System Management Bus (SMBus). In a further embodiment, the communication channels 137-a, 137-b is a Low Pin Count (LPC) bus. In one example, the communication channel 137-a and the communication channel 137-b use different protocols.

Figure 2:
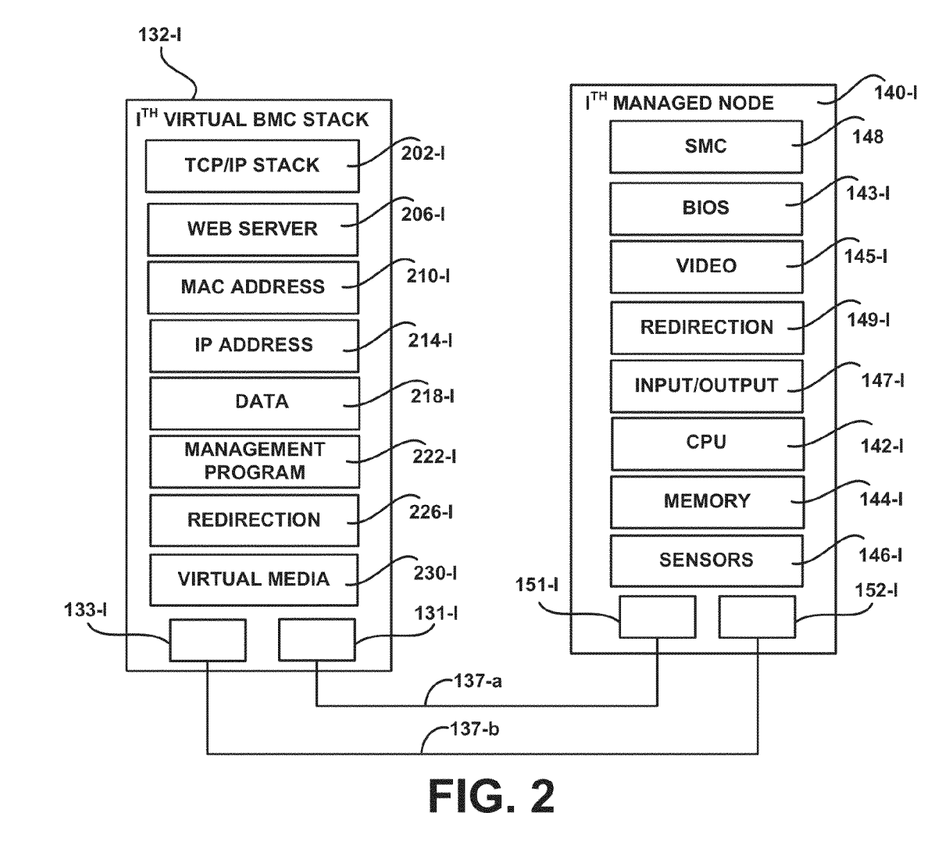
FIG. 2 schematically shows a virtual BMC stack and a corresponding managed computer node in accordance with certain embodiments of the present disclosure.

Referring also now to FIG. 2, a virtual BMC stack 132-I is shown according to certain embodiments of the present disclosure. Each virtual BMC stack 132-I is initiated to manage one corresponding computer node 140-I. The virtual BMC stack 132-I can include a TCP/IP stack 202, a web server application program 206, and the MAC address 210 that identifies the virtual BMC stack 132-I as the destination of network packets addressed to the MAC address 210. The virtual BMC stack 132 can also include a management program 212 performing management function to a corresponding managed computer node 140-I, a data storage 218 storing data collected from the corresponding managed computer node 140-I; and a communication interface 131-I, 133-I configured to enable communication between the virtual BMC stack 132-I and the corresponding managed computer node 140-I over communication channels 137-a, 137-b. Further, the virtual BMC stack can also include a redirection module 226 and a virtual media module 230.

The corresponding managed computer node 140-I can include:

(1) an optional satellite management controller (SMC) 148 configured to collect data from the managed computer node 140-I, to perform certain management functions, and to send data and responses to the corresponding virtual BMC stack 132-I;
(2) a node CPU 142-I;
(3) a node memory 144-I;
(4) sensors 146-I configured to monitor the health and performance related data of the computer node 140-I;
(5) a communication interface 151-I, 152-I;
(6) BIOS 143-I;
(7) a graphics adapter (video output) 145-I;
(8) a redirection module 149-I; and
(9) an input/output module 147-I.

As stated above, the virtual BMC stack 132-I can control and collect information of sensors, sensor data record (SDR) devices, and field replaceable units (FRUs). The virtual BMC stack 132 can provide one or more of the following exemplary management functions:

(1) power up a node remotely for deployment;
(2) check a node's health condition remotely;
(3) power cycle a node remotely to bring up the cluster configuration after the OS has been deployed;
(4) monitor sensor readings remotely;
(5) monitor system event log (SEL) readings remotely;
(6) provide a remote text console (eliminates one out-of-band management fabric); and
(7) provide remote power management (power up, power down, and/or power cycle).

In certain embodiments, the managed computer nodes 140-I, I=1, 2, ..., N each further include one or more operating systems as well as one or more application programs. The operating system comprises a set of programs that control operations of managed computer nodes 140-I, I=1, 2, ..., N, the management device 120 and allocation of resources. The set of programs, inclusive of certain utility programs, may also provide a graphical user interface to a user. An application program is software that runs on top of the operating system software and uses computer resources made available through the operating system to perform application specific tasks desired by the user. The operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

Figure 3:
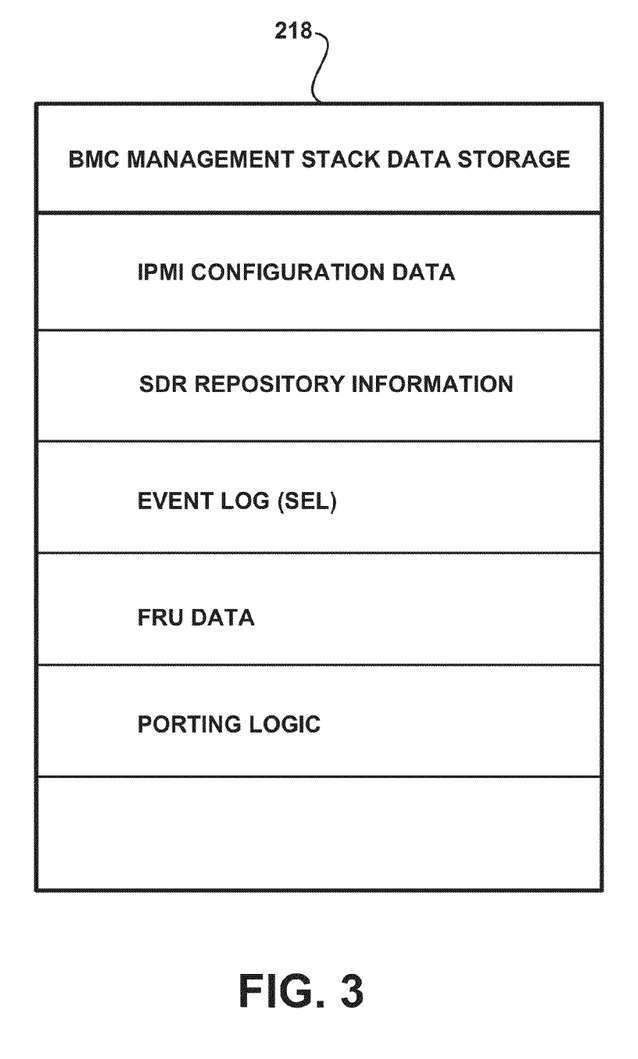
FIG. 3 schematically shows data contents of a virtual BMC stack in accordance with certain embodiments of the present disclosure.

In one embodiment, as shown in FIG. 3, the data storage 218 of the virtual BMC stack 132-I stores configuration data, computer health data and/or control parameters collected by the sensors 146-I of the managed computer node 140-I for performing management functions. The configuration data, computer health data and/or control parameters include one or more of the following:

(1) IPMI configuration data;
(2) sensor data record repository (SDR) information;
(3) system event log (SEL) information;
(4) field replaceable unit (FRU) information; and
(5) porting logic information.

In certain embodiments, the remote management computer 108 includes a web browser (not shown in FIG. 1), such as the INTERNET EXPLORER web browser from MICROSOFT CORPORATION of Redmond, Wash., that enables the remote management computer 108 to communicate over the Internet, local area network (LAN), wide area network (WAN) 106 with the BMC 120.

In certain embodiments, by executing the web server application program 206 and the TCP/IP stack 202, and programming the network interface controller 122 to forward network packets addressed to the MAC address 210, the virtual BMC stack 132-I can receive and respond to requests for management information via a web interface. This implementation enables direct communication from the remote management computer 108 to the virtual BMC stack 132-I. Further, because the virtual BMC stack 132-I has been allocated a MAC address 210, an IP address 214 may also be allocated to the virtual BMC stack 132-I. The IP address 214 identifies the virtual BMC stack 132-I on the TCP/IP network so that network packets may be routed to and from the virtual BMC stack 132-I the IP address 214. The IP address 214 may also be allocated a domain name that may be utilized in a URL to identify one or more web pages available from the web server application program 206.

The virtual BMC stack 132-I also includes the management program 222 that can configure or program the network interface controller 122 to pass network packets addressed to the MAC address 210 and received over the network 104 to the virtual BMC stack 132-I. The management program 222 also monitors, analyzes, and communicates measured operating and performance-related parameters of the corresponding managed computer node 140-I, for example as sensed via the sensors 146-I. The sensors 146-I measure or sense operating and performance-related parameters associated with the corresponding managed computer node 140-I and provide this information to the virtual BMC stack 132-I via the communication channels 137-a, 137-b for analysis, and more particularly, for determination on whether an "event" is occurring within the corresponding managed computer node 140-I.

In one embodiment, the corresponding managed computer node 140-I also has a redirection module 149-I, a graphic adapter 145-I, a CPU 142-I, a memory 144-N, and sensor devices 146-I. The redirection module 149-I allows a user to control the keyboard and mouse functions of the managed corresponding managed computer node 140-I from the remote management computer 108 over the network 104. The redirection module 149-I may also be utilized to provide the video display shown on the managed corresponding managed computer node 140-I to the remote management computer 108. In particular, in accordance with illustrative embodiments of the present disclosure, the redirection module 149-I communicates compressed video data generated on the managed corresponding managed computer node 140-I to the remote management computer 108. To accomplish the above-noted and other functions, the redirection module 149-I is communicatively connected to one or more components either directly or by way of a management bus. In particular, the redirection module 149-I is connected to a video out port of the graphic adapter 145-I, as well as a keyboard input port and a mouse input port of the input/output module 147-I. It will be appreciated that the keyboard port and mouse port may include universal serial bus ("USB") ports and/or PS/2 ports. It should be appreciated that the redirection module 149-I may receive keyboard and mouse commands from the remote management computer 108 via the network 104. When received, the redirection module 149-I is operative to pass the commands through to the input/output module 147-I so that the commands appear to the managed corresponding managed computer node 140-I to have been made utilizing local keyboard and mouse devices.

In certain embodiments, the virtual BMC stack 132-I is communicatively connected to the management bus. The management bus is used by the redirection module 149-I to communicate compressed video data to the virtual BMC stack 132-I. Like the system bus, the component that initiates communication on a bus is referred to a master and the component to which the communication is sent is referred to a slave. As such, the redirection module 149-I functions as the master on the management bus in most circumstances, but may also function as a slave in other circumstances. Each of the various components communicatively connected to the redirection module 149-I by way of the management bus is addressed using a slave address. In one embodiment, the management bus may be an I$^2$C® bus, which is manufactured by Phillips Semiconductors® and described in detail in the I$^2$C® bus Specification, version 2.1 (January 2000). The redirection module 149-I or the virtual BMC stack 132-I can also include compression program code which may be an executable program module containing program code for filtering and compressing video data for communication over the network 104 to the remote management computer 108. It should be appreciated that the redirection module 149-I may be configured with its own network adapter for communicating with the remote management computer 108 directly over the network 104.

The graphic adapter 145-I can also be utilized to display of video data (i.e., text and/or graphics) on a display unit. It will be appreciated that the video graphics adapter may process analog signals (i.e., VGA) or digital signals (i.e., DVI) for display on a compatible display unit. The video graphic adapter 145-I includes a video buffer for temporarily storing one or more lines of video data to be displayed on the display unit.

In accordance with an illustrative embodiment of the present disclosure, the components of the redirection module 149-I may be incorporated into a firmware card, such as a PCI card, which is "plugged-in" to the motherboard of the managed corresponding managed computer node 140-I. These components may include a field-programmable gate array ("FPGA"). For example, the FPGA can communicate with the virtual BMC stack 132-I over parallel bus. The virtual BMC stack 132-I can have a redirection program 226 that instructs the FPGA to capture screens of video data and compress changed video data from the video graphic adapter 145-I in accordance with program instructions contained in the compression program code. In certain embodiments, once the changed video data has been compressed, the FPGA generates and sends an interrupt signal to the virtual BMC stack 132-I. The virtual BMC stack 132-I then sends the compressed video data to the remote management computer 108 via the network interface controller 122. It will be appreciated that the FPGA and the BMC 120 may be application specific circuits ("ASICs") designed for performing the aforementioned tasks. ASICs are well known to those skilled in the art. Those skilled in the art will further appreciate that the redirection module 149-I may also be incorporated as an external hardware device. The external device may include a video port for connection to a video graphics adapter, keyboard and mouse ports, and a network port (e.g., a network interface card) for connection to a computer network.

Further, the virtual BMC stack 132-I may also have a virtual media program 230 that provides for additional management with the remote management computer 108 by providing a USB connection to a USB port of the managed corresponding managed computer node 140-I. The USB connection allows the virtual BMC stack 132-I to emulate USB devices for the managed corresponding managed computer node 140-I, such as additional mass storage devices including devices that the managed corresponding managed computer node 140-I may use when booting-up. For example, the remote management computer 108 may provide a floppy, CD-ROM, or hard disk drive that contains a boot-up sequence to be used by the managed corresponding managed computer node 140-I. Upon a connection being established over the network 104 between the virtual BMC stack 132-I and the remote management computer 108, the managed corresponding managed computer node 140-I may boot from a media source of the remote management computer 108 with the boot-up sequence provided through the USB port.

As an example, the virtual BMC stack 132-I may emulate a mass storage device, such as the emulated CD-ROM device, on a USB connection. The emulated CD-ROM device may be utilized to redirect the contents of a mass storage device attached to the remote management computer 108 to the managed corresponding managed computer node 140-I. The emulated CD-ROM device may also be utilized for providing out-of-band communication between the managed corresponding managed computer node 140-I and the virtual BMC stack 132-I. The emulated CD-ROM device appears to the managed corresponding managed computer node 140-I as a standard USB CD-ROM. Accordingly, the operating system executing on the corresponding managed computer node 140-I utilizes a standard CD-ROM driver provided by the manufacturer of the operating system utilized on the managed corresponding managed computer node 140-I for communicating with the CD-ROM device. Custom hardware drivers may be unnecessary.

In certain embodiments, each of the BMC stack has its own network address. In certain embodiments, when the firmware is executed by the processor 127, the processor 127 spawns N virtual BMC stacks, 132-I, I=1, 2, . . . , N, one for each of the plurality of the managed computer nodes 140-I, I=1, 2, . . . , N. For example, the first virtual BMC stack 132-1 corresponds to the first managed computer node 140-1. The second virtual BMC stack 132-2 corresponds to the second managed computer node 140-2. The N-th virtual BMC stack 132-N corresponds to the N-th managed computer node 140-N.

The network interface controller 122 is capable of connecting the BMC 120 to a network of remote computers via a network 104. A remote management computer 108 as shown in FIG. 1, may be a desktop computer, a server, a router, a network PC (personal computer), or a peer device or other common network node. Networked connections may include a local area network (LAN) or a wide area network (WAN). Such networking environments are commonplace in offices, enterprise-wide computer networks, intranets, and the Internet.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A baseboard management controller (BMC) managing a computer system including N computer nodes, N being an integer greater than 1, comprising:
a processor;
a first communication interface controller;
a memory having firmware stored therein, wherein the firmware, when executed by the processor, is configured to
dynamically obtain the value of N; and
initiate N virtual BMC stacks each managing at least one health or performance related aspect of a respective one of the N computer nodes, wherein first and second virtual BMC stacks of the N virtual BMC stacks communicate, through the first communication interface controller, with the first and second computer nodes of the N computer nodes, respectively.

2. The BMC of claim 1, wherein the firmware, when executed by the processor, is configured to access a configuration file to obtain the value of N.

3. The BMC of claim 1, wherein the firmware, when executed by the processor, is configured to
initiate a predetermined number of virtual BMC stacks, including the first virtual BMC stack, during a booting process, wherein the first virtual BMC stack communicates with each of the N computer nodes to obtain the value of N.

4. The BMC of claim 3, wherein the first virtual BMC stack is configured to receive an IPMI message from each of the N computer notes during obtaining the value of N.

5. The BMC of claim 4, wherein the first virtual BMC stack is configured to receive the IPMI message from a BIOS or an OS of the each computer node.

6. The BMC of claim 1, wherein the firmware, when executed by the processor, is configured to
initiate a predetermined number of virtual BMC stacks, including the first virtual BMC stack, during a booting process, wherein the first virtual BMC stack receives an IPMI message from one of the N computer nodes, the IPMI message indicating the value of N.

7. The BMC of claim 1, wherein each of the virtual BMC stacks implements all management functions for managing health and performance related aspects of the respective one of the N computer nodes.

8. The BMC of claim 1, wherein each of the virtual BMC stacks includes a Web server, a management program, a redirection program, and a virtual media program.

9. The BMC of claim 1, wherein the first communication interface controller is a controller for controlling one of a keyboard controller style ("KCS") interface, a system management interface chip ("SMIC") interface, a block transfer ("BT") interface, an SMBus System Interface (SSIF), an IPMB interface, a USB interface, a serial/modem interface, and a network interface.

10. The BMC of claim 1, further comprising a second communication interface controller different from the first communication interface controller, wherein the first and second virtual BMC stacks communicate, through the second communication interface controller, with the first and second computer nodes, respectively.

11. A base board management controller (BMC) implemented method for managing a computer system having N computer nodes, N being an integer greater than 1, comprising:
dynamically obtaining, at the BMC, the value of N by accessing a configuration file by a firmware stored in a memory of the BMC; and
initiating N virtual BMC stacks at a processor, each managing at least one health or performance related aspect of a respective one of the N computer nodes, wherein first and second virtual BMC stacks of the N virtual BMC stacks communicate, through a first communication interface controller, with the first and second computer nodes of the N computer nodes, respectively.

12. The BMC implemented method of claim 11, comprising:
initiating, at the BMC, a predetermined number of virtual BMC stacks, including the first virtual BMC stack, during a booting process, wherein the first virtual BMC stack communicates with each of the N computer nodes to obtain the value of N.

13. The BMC implemented method of claim 12, further comprising:
receiving, at the first virtual BMC stack, an IPMI message from each of the N computer notes during obtaining the value of N; and
receiving, at the first virtual BMC stack, the IPMI message from a BIOS or an OS of the each computer node.

14. The BMC implemented method of claim 11, further comprising:
initiating, at the BMC, a predetermined number of virtual BMC stacks, including the first virtual BMC stack, during a booting process, wherein the first virtual BMC stack receives an IPMI message from one of the N computer nodes, the IPMI message indicating the value of N.

15. The BMC implemented method of claim 11, wherein each of the virtual BMC stacks implements all management functions for managing health and performance related aspects of the respective one of the N computer nodes.

16. The BMC implemented method of claim 11, wherein each of the virtual BMC stacks includes a Web server, a management program, a redirection program, and a virtual media program.

17. The BMC implemented method of claim 11, wherein the first communication interface controller is a controller for controlling one of a keyboard controller style ("KCS") interface, a system management interface chip ("SMIC") interface, a block transfer ("BT") interface, an SMBus System Interface (SSIF), an IPMB interface, a USB interface, a serial/modem interface, and a network interface.

18. The BMC implemented method of claim 11, further comprising: the first and second virtual BMC stacks communicating, through a second communication interface controller, with the first and second computer nodes, respectively, wherein the second communication interface controller is different from the first communication interface controller.

19. A non-transitory computer storage medium having computer-executable instructions stored thereon which, when executed by a processor of a base board management controller (BMC), cause the processor to:
dynamically obtain a value of N, N being an integer greater than 1; and
initiate N virtual BMC stacks at the processor, each managing at least one health or performance related aspect of a respective one of the N computer nodes, wherein first and second virtual BMC stacks of the N virtual BMC stacks communicate, through a first communication interface controller, with the first and second computer nodes of the N computer nodes, respectively.

20. The non-transitory computer storage medium of claim 19, wherein the computer-executable instructions cause the processor to
initiate, at the BMC, a predetermined number of virtual BMC stacks, including the first virtual BMC stack, during a booting process, wherein the first virtual BMC stack communicates with each of the N computer nodes to obtain the value of N.

21. The non-transitory computer storage medium of claim 19, wherein the computer-executable instructions cause the processor to
receive, at the first virtual BMC stack, an IPMI message from each of the N computer notes during obtaining the value of N; and
receive, at the first virtual BMC stack, the IPMI message from a BIOS or an OS of the each computer node.

22. The non-transitory computer storage medium of claim 19, wherein the computer-executable instructions cause the processor to
initiate, at the BMC, a predetermined number of virtual BMC stacks, including the first virtual BMC stack, during a booting process, wherein the first virtual BMC stack receives an IPMI message from one of the N computer nodes, the IPMI message indicating the value of N.

23. The non-transitory computer storage medium of claim 19, wherein each of the virtual BMC stacks implements all management functions for managing health and performance related aspects of the respective one of the N computer nodes, and each of the virtual BMC stacks includes a Web server, a management program, a redirection program, and a virtual media program.

24. The non-transitory computer storage medium of claim 19, wherein the first communication interface controller is a controller for controlling one of a keyboard controller style ("KCS") interface, a system management interface chip ("SMIC") interface, a block transfer ("BT") interface, an SMBus System Interface (SSIF), an IPMB interface, a USB interface, a serial/modem interface, and a network interface.

25. The non-transitory computer storage medium of claim 19, wherein the computer-executable instructions cause the processor to communicate the first and second virtual BMC stacks, through a second communication interface controller, with the first and second computer nodes, respectively, wherein the second communication interface controller is different from the first communication interface controller.

* * * * *